United States Patent
Janz

(10) Patent No.: US 6,702,327 B2
(45) Date of Patent: Mar. 9, 2004

(54) SET OF STRUCTURAL COMPONENTS FOR REVERSING ELEMENTS OF SEAT BELT SYSTEMS IN MOTOR VEHICLES

(76) Inventor: Norbert Janz, Starstrasse 21, D-14612 Falkensee (DE)

( * ) Notice: Subject to any disclaimer, the term of this patent is extended or adjusted under 35 U.S.C. 154(b) by 42 days.

(21) Appl. No.: 10/056,429

(22) Filed: Jan. 24, 2002

(65) Prior Publication Data

US 2003/0080547 A1 May 1, 2003

(30) Foreign Application Priority Data

Oct. 30, 2001 (DE) .......................... 101 53 062

(51) Int. Cl.$^7$ ................................ B60R 22/24
(52) U.S. Cl. ........................ 280/808; 297/483
(58) Field of Search ................. 280/808, 801.1; 297/482, 483

(56) References Cited

U.S. PATENT DOCUMENTS

| | | | | | |
|---|---|---|---|---|---|
| 3,959,855 | A | * | 6/1976 | Fisher | 24/163 FC |
| 4,378,947 | A | * | 4/1983 | Fohl | 280/808 |
| 4,762,338 | A | * | 8/1988 | Hayden | 280/801.1 |
| 5,513,880 | A | * | 5/1996 | Ohira et al. | 280/808 |
| 5,601,311 | A | * | 2/1997 | Pfeiffer et al. | 280/801.1 |
| 6,033,030 | A | * | 3/2000 | Valasin | 297/483 |
| 6,533,322 | B2 | * | 3/2003 | Janz | 280/808 |

FOREIGN PATENT DOCUMENTS

DE          100 11 725          3/2000

* cited by examiner

Primary Examiner—David R. Dunn
(74) Attorney, Agent, or Firm—Collard & Roe, P.C.

(57) ABSTRACT

A set of structural components for reversing elements of seat belt systems in motor vehicles. The set is comprised of a one-piece metal body produced from a steel sheet by cold forming; at least one plastic adapter and a set of profiled elements having differently shaped profiles. These profiles of the metal body are coupled by pairs by a plug connection. The metal body, as a standard component, has uniformly fixed dimensions which do not depend on the concrete installation of the of the reversing element. This design permits the installation of a metal body in the B-post of motor vehicles. These profiled elements comprise plastic profiles designed as sight shutters whose shape is adapted to the concrete installation in a motor vehicle. With covered or half-covered installation of the reversing element, the edge of an opening located in the covering side of the body of the vehicle for receiving the reversing element permits the pivotal movement to be engaged by the plastic profiles from behind.

12 Claims, 5 Drawing Sheets

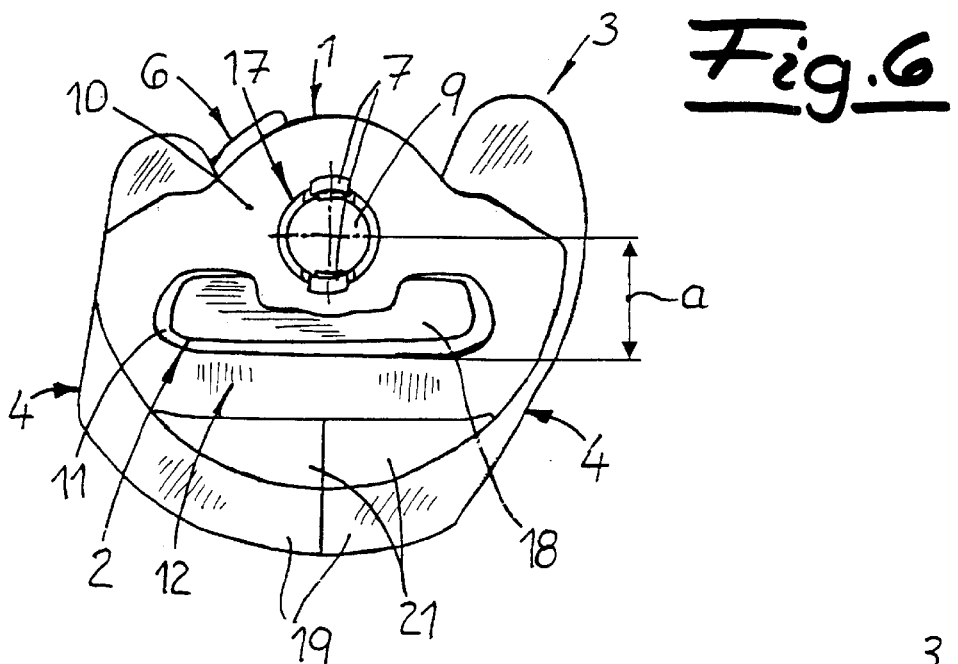
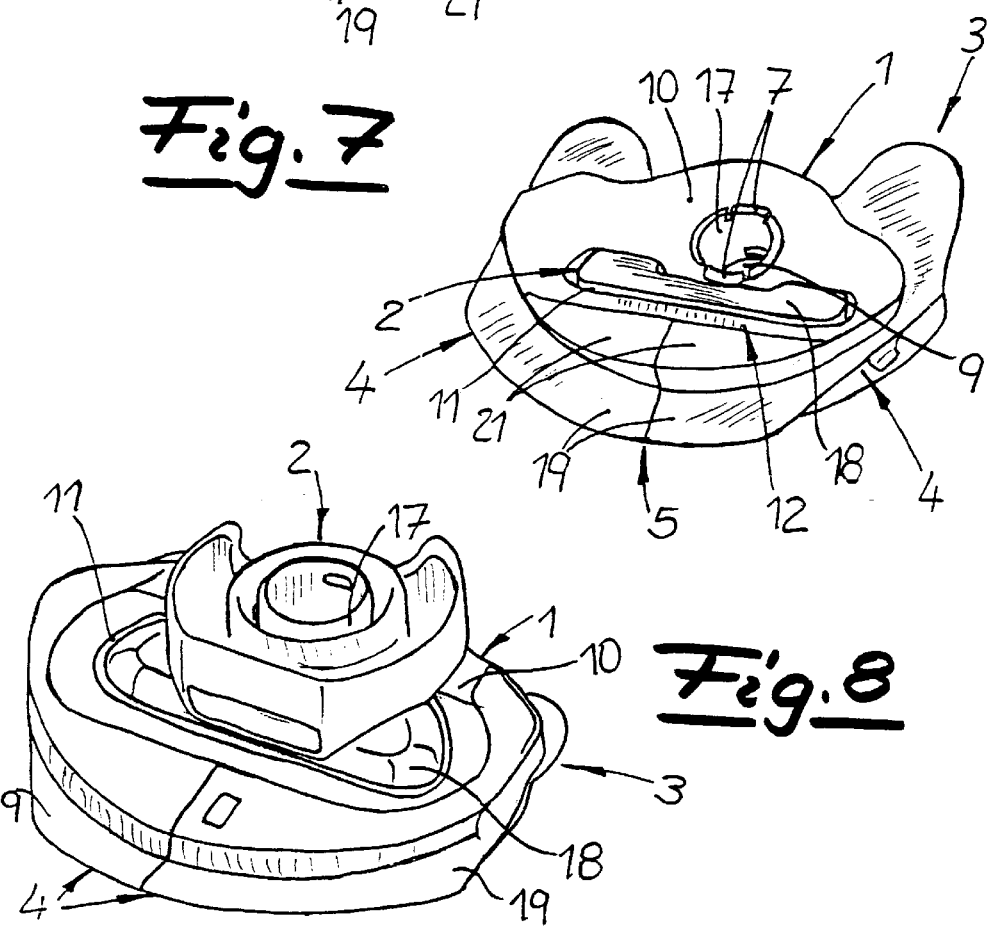

SET OF STRUCTURAL COMPONENTS FOR REVERSING ELEMENTS OF SEAT BELT SYSTEMS IN MOTOR VEHICLES

BACKGROUND OF THE INVENTION

1. Field of the Invention

The invention relates to a reversing element for seat belt systems in motor vehicles.

2. The Prior Art

A reversing element known from DE 100 11 725 C1 is designed as a stamped steel sheet part designed so that the reversing element can be mounted within the encasement of a B-post of a motor vehicle. A multi-stage reshaping process is required for producing this reversing element. The adaptation of the reversing element to different installation situations results in a high cost manufacturing and engineering.

SUMMARY OF THE INVENTION

The invention relates to a reversing element or seat belt guide that can be adapted to different installation situations with simple means. With a covered or semi-covered installation within the post of a motor vehicle, the opening required for the passage of the seat belt within the covering (or lining) has to be closed by a sight shutter or cover on the vehicle side which permits pivotal movements of the reversing element.

One object of the invention is to provide a set of structural components for reversing elements of seat belt systems in motor vehicles. This set is comprised of at least the following components:

A metal body produced from a steel sheet by cold forming. This body comprises a fastening opening in a mounting surface on the backside; a belt eye, and a belt-guiding segment framing the belt eye on the underside and on the sides. This segment for guiding the belt forms a running surface with a rounded cross section for a seat belt, and a double-walled edge profile for the connection of plastic profiles.

There is also at least one plastic adapter comprising a collar that can be inserted in the fastening opening of the metal body, and a displacing body that can be fixed on the upper edge of the belt eye for limiting the width of the gap of the belt slot.

There is also a set of profiled elements comprising differently shaped plastic profiles that can be laterally pushed onto the edge profile of the metal body and coupled in pairs by a plug connection.

The metal body, as a standard structural component, has uniformly fixed dimensions irrespective of the concrete installation situation of the reversing element. This reversing element permits the installation of the metal body in the B-post of motor vehicles. Furthermore, the set of profiled elements comprises plastic profiles designed as sight shutters whose form is adapted to the concrete installation situation in a motor vehicle. If the reversing element is installed in a covered or half-covered manner, these plastic profiles engage from the edge of an opening from behind, receiving the reversing element which permits pivotal movements in a covering on the side of the body of the vehicle.

The outer dimensions of the metal body are usefully disposed within a circle drawn around the fastening opening with a radius of 43 mm. The spacing between the center point of the fastening opening and the belt running surface is preferably fixed in a range of from 19 mm to 24 mm.

According to the invention, the metal body forms a system component that is not changed via its construction if the reversing element has to be adapted to the given installation situation. Adaptation to the given installation situation is accomplished by modifying the detachably connected plastic parts, which can be produced at favorable cost in the form of injection-molded components. Modifications can be made by exchanging the plastic profiles, which are laterally connected with the metal body in a detachable manner, so that the reversing element can be used for half-covered installation, covered installation, or also for an external structure. Horizontal installation situations can also be formed. The use of the metal body as a standard component in combination with different plastic components permits a rational manufacture of the reversing elements required for different types of vehicle, and substantially simplifies stockkeeping.

The metal body is preferably produced from a steel sheet material with a thickness of 2 to 4 mm. The shaped areas may have smaller wall thickness values due to the flow processes occurring in the course of cold forming. The metal body can be manufactured by multi-stage cold forming. To produce a turned-over collar on the backside surrounding the eye of the belt, the material has a cut that first forms the upper edging of the belt eye. The material remaining in the area of this belt eye forms a metal sheet tab that is subsequently reshaped to form the backside, forming a turned-over collar. The back side collar formed into the belt eye and the bead-like front side jointly form a wide surface on which the seat belt is running. This running surface has a rounded, curved cross section extending without steps up into the corner areas of the belt eye. The seat belt is safely guided on this wide running surface when the reversing element performs pivotal movements in a crash situation.

In a crash situation, any deformation of the running surface can stabilize the guidance of the seat belt and prevent the seat belt from slipping into a corner of the belt eye. In a preferred embodiment of the invention, the profile of the running surface for the safety belt is designed so that under test conditions, simulating a crash situation, the belt running surface bends so that it centers the seat belt on the running surface. The term "test conditions" pertains to a front collision test in which the reversing element is installed in a seat belt system. Such a front collision test occurs with a dummy at a preset speed at the time of impact. A support for the seat belt is designed with a relatively elastic bending property, wherein the seat belt is guided in the event of a crash. The thickness of the material and also the width of the reshaped metal sheet segments are factored into the dimensions of the support. The construction is fixed based on strength calculations with the help of a few empirical tests. In a crash, the connected plastic profiles have no bearing on the behavior of the reversing element.

The front side of the belt running surface of the metal body, which is shaped like a bead, has a substantially straight terminating edge. Furthermore, the metal body has a sliding body reducing its resistance to friction. This body may have galvanically applied coatings, such as chrome coatings. These metallic coatings exhibit good resistance to abrasion and have a long useful life. However, superior friction values are obtained if a sliding coating with a fluorine polymer matrix having reinforcing substances is used. This sliding coating should have a thickness of less than 100 $\mu$m. While the fluorine polymer matrix of the sliding coating supplies adequate thermal stability, the incorporated, preferably particulate reinforcing substances create a sufficient resistance to abrasion. The low thickness of the coating of less than 100 μm, preferably from 15 μm to 80 μm, assures good dissipation of heat into the metal body. As a result, there is a favorable effect on the heating of the running surface in the event of a crash. Moreover, the coating described above has a distinctly lower emission of noise when the belt is pulled out, as compared to designs jacketed with plastic or chrome-plated coatings.

The plastic adapter, which can be secured on the mounting surface of the metal body, substantially contributes to the proper functioning of the seat belt. This adapter comprises a displacing body that can be fixed on the upper edge of the belt eye which limits the gap width of the belt slot. The gap width is adapted to the seat belt and is selected so that the belt can be moved substantially without coming into contact with the plastic material within the belt slot. This design prevents the formation of folds. The plastic adapter is a guiding element that is not subjected to any stresses in the event of a crash. It can be produced as a simple injection-molded component and secured on the metal body by plug connections. Furthermore, stop elements for limiting the angle of pivot can be molded onto the plastic adapter, forming one single piece with the adapter.

In a preferred embodiment of the invention, the set of structural elements additionally comprise at least one stop disk with stop elements for limiting the pivot angle, which are molded onto this stop disk. This stop disk can be connected to the backside of the plastic adapter and may comprise an opening corresponding with the fastening opening of the metal body. By exchanging the stop disks, it is possible to make adaptations to the permissible pivot angle range in a very simple manner.

An important component of the set of structural components is the set of profiled elements comprising differently shaped plastic profiles, which can be laterally pushed onto the edge profile of the metal body and coupled in pair by a plug connection. If the reversing element is intended for covered or half-covered installation in the post of the body of the vehicle, the plastic profiles act as sight shutters. The plastic profiles have tabs protruding sideways and engage the opening in a covering (or facing) on the side of the vehicle body from behind. This opening receives the edge of the reversing element and permits pivotal movements. Furthermore, the plastic profiles may comprise a circular segment-shaped sight area adjoining the belt running surface of the metal body in a flush manner and wherein it is adapted to the edge of the opening in the facing on the side of the body of the vehicle. The lateral tabs adjoin this sight area with a step. Moreover, by exchanging the plastic profiles, the reversing element can be refitted so that it is also suitable for external mounting on a visible surface in the interior of the vehicle. In such a case, the plastic profiles designed as sight shutters are replaced by rounded edge protection profiles.

Finally, the set of structural components can be expanded by additional cover caps, which can be secured on the front side of the metal body and cover the mounting surface as well as a fastening screw which secures the reversing element on the body of the vehicle. The cover cap is used if the reversing element has to be visibly mounted in the interior of the vehicle.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 6 shows a front perspective view of another embodiment of the invention.

FIG. 7 shows a side perspective view of another embodiment of the invention.

FIG. 8 shows a bottom perspective view of another embodiment of the invention.

DETAILED DESCRIPTION OF THE PREFERRED EMBODIMENT

Figure 1:
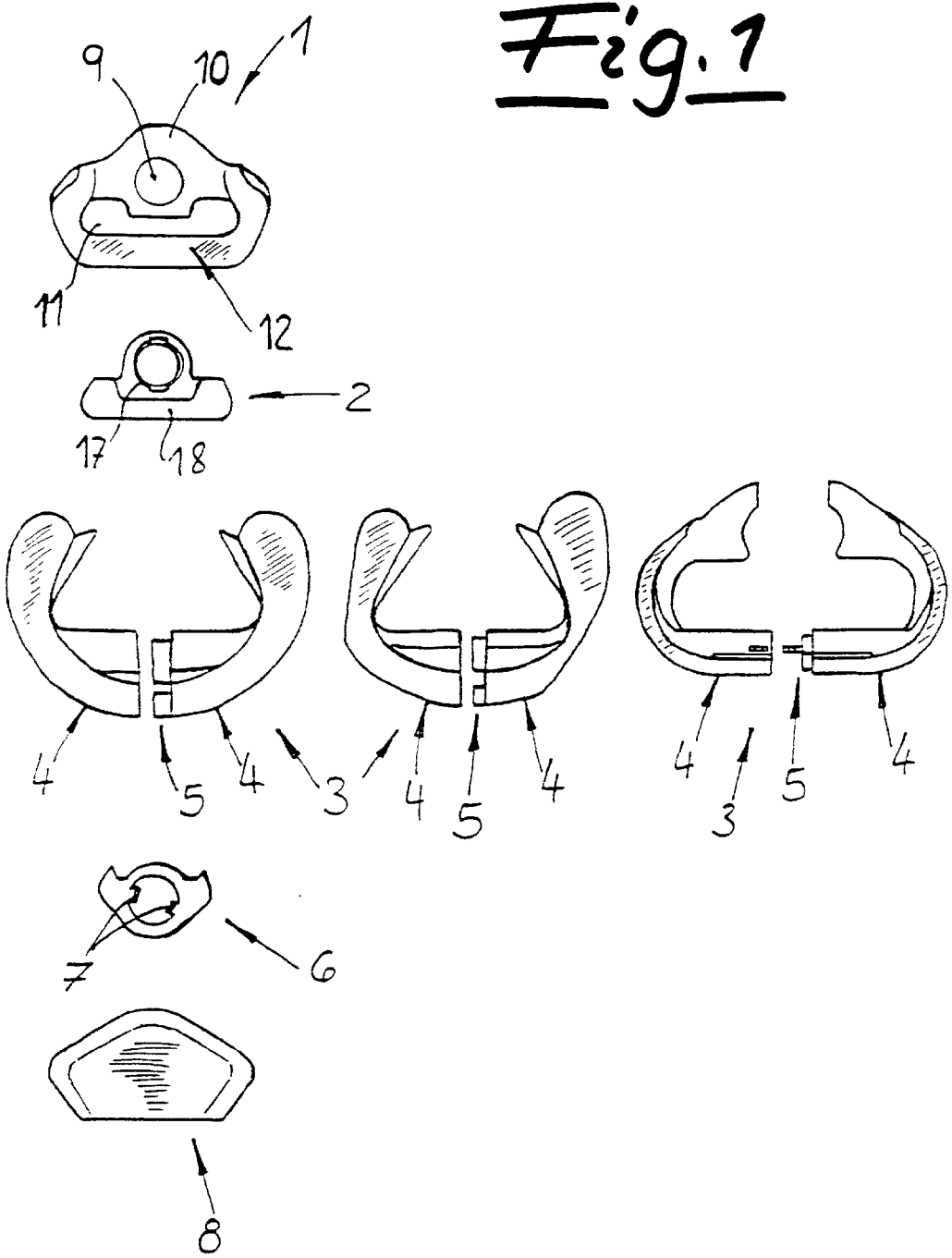
FIG. 1 shows a set of structural components for reversing elements of seat belt systems for motor vehicles.

Referring now in detail to the drawings, FIG. 1 shows a set of structural components comprising a metal body 1 produced as one single piece from steel sheet by cold forming. There is also at least one plastic adapter 2, and a set of the plastic profiles 3 comprising differently shaped plastic profiles 4. These profiles 4 can be laterally pushed onto an edge profile of the metal body and coupled in pairs by a plug connection 5. The set of structural components can be expanded by additional stop disks 6 with molded-on stop elements 7 which limit the angle of pivot, as well as by a cover cap 8, which can be secured on the front side of the metal body 1. This cover cap covers a mounting surface and a fastening screw for securing the reversing element on the body of the motor vehicle.

Figure 5:
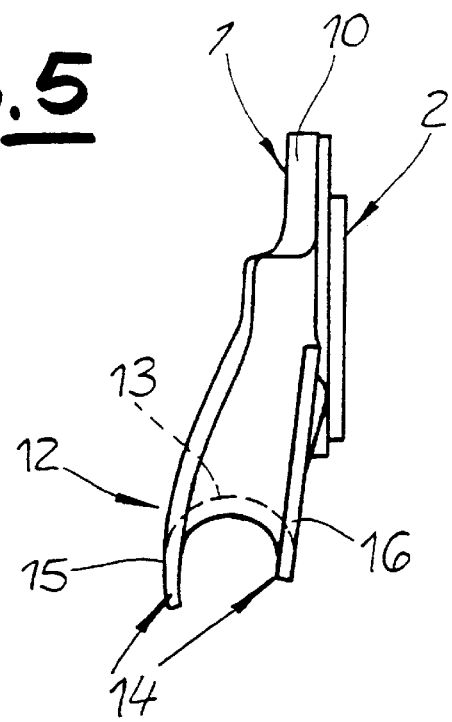
FIG. 5 is a side view of the object shown in FIG. 4.

Metal body 1 comprises a fastening opening 9 located on a backside mounting surface 10, a belt eye 11, and a belt-guiding segment 12, framing the belt eye 11 on the underside and laterally. FIG. 5 shows belt-guiding segment 12 protrudes out of the mounting surface 10 and forms a wide running surface 13 for a seat belt. This running surface has a rounded cross section; and a double-walled edge profile 14 for connecting plastic profiles 4. Metal body 1, as a standard structural component, has uniformly fixed dimensions irrespective of the concrete installation situation of the reversing element. This design allows the installation of metal body 1 in the B-post of motor vehicles. The outer dimensions of metal body 1 are within a circle drawn around the fastening opening 9 and have a radius of 43 mm. The spacing "a" between the center point of fastening opening 9 and belt running surface 13 is fixed in the range of 19 mm and 24 mm.

Figure 4:
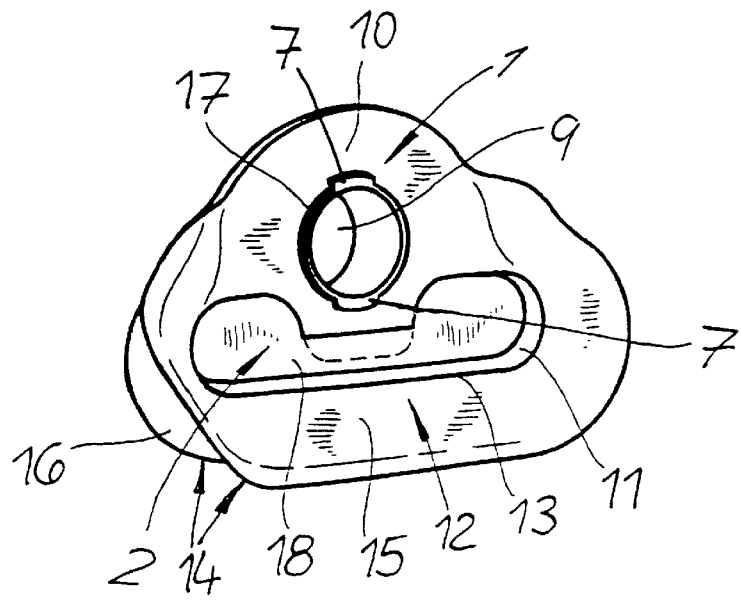
FIG. 4 is a perspective representation of the front side of the reversing element shown in FIGS. 2 and 3, but without laterally connected plastic components.

A comparative view of FIGS. 4 and 5 shows that belt guiding segment 12 of metal body 1 has a front side 15 rounded in the form of a bead, and a collar 16 turned over toward the backside. Backside collar 16 and bead-like front side 15 form a profile with a curved cross section acting as surface 13 on which the seat belt is running. The profile is designed so that under test conditions applicable to a crash situation, belt running surface 13 is subjected to bending with permanent deformation in the center of the running surface. This bending centers the seat belt on the running surface.

The crash of a vehicle is simulated under the test conditions. When the vehicle or the test device fitted with the dummy impacts an obstacle, the reversing element is subjected to strains by the seat belt. Defined bending of the belt running surface 13, with such bending being connected with the aforementioned permanent deformation, has a favorable effect on the distribution of the forces which the seat belt exerts on the person to be protected. The correct guidance of the seat belt in the crash situation is favorably influenced by the deformation of the support. Metal body 1 is made of steel sheet and produced from a small steel sheet plate with a steel sheet thickness of 2 to 4 mm. Because of the flow of material occurring during cold forming, the thickness of the material is reduced in the reshaped areas. The thickness of the material, the material properties, and its profile creates a belt running surface 13 to maintain these conditions.

Metal body 1 may comprise a sliding coating reducing the resistance to friction. This sliding coating should be made of a fluorine polymer matrix and reinforcing substances incorporated in this matrix. The coating is thin and has a thickness of less than 100 $\mu$m. This coating is very smooth and reaches a surface roughness "Ra" of less than 2 $\mu$m. The coating material can be applied to metal body 1 via an electrostatic powder coating with a subsequent thermal treatment; a wet-lacquering method, or according to an eddy current inter-process. The application method is controlled so that the thinnest possible sliding coating is produced, which, however, forms a dense surface for the purpose of protecting metal body 1 against corrosion. To increase the adhesion of the sliding coating on the substrate, the metal body can be subjected to a pretreatment before the coating is applied.

Figure 2:
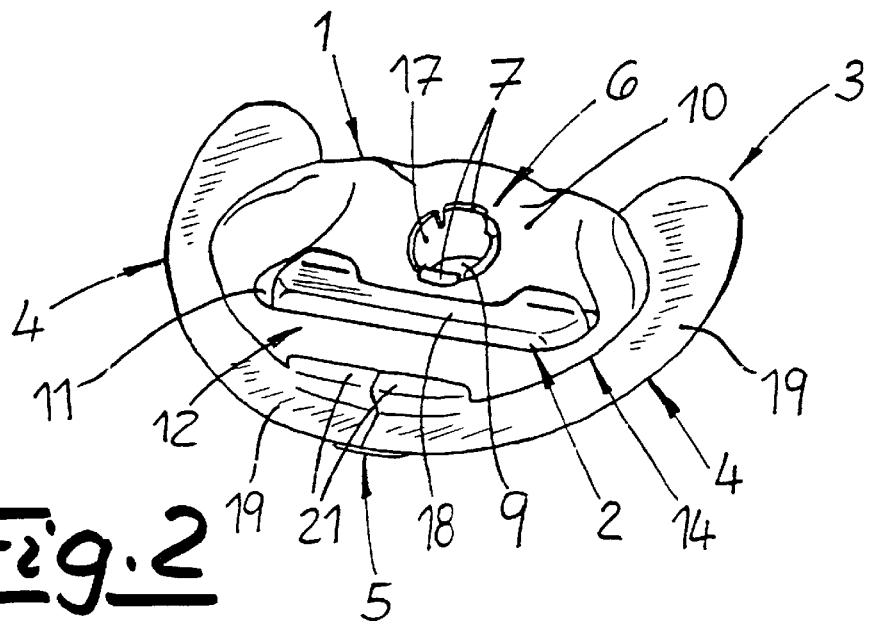
FIG. 2 is a perspective view of the front side of a reversing element produced with the set of structural elements for a seat belt.
Figure 3:
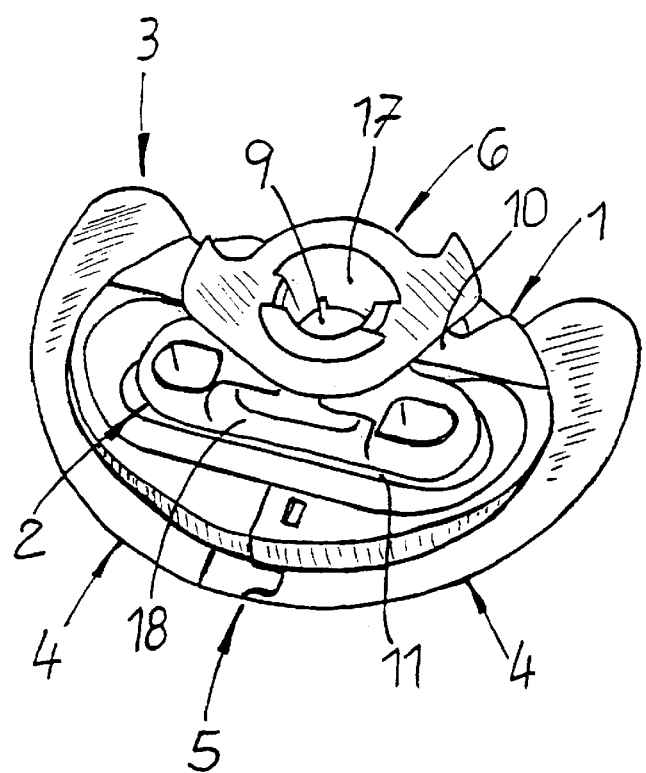
FIG. 3 is a perspective view of the backside of the object shown in FIG. 2.

Plastic adapter 2 comprises a collar 17 that can be inserted in fastening opening 9 of metal body 1, and a displacing body 18 that can be fixed on the upper edge of belt eye 11 for limiting the gap width of the belt slot. Stop elements 7 limit the angle of pivot, and can be arranged on plastic adapter 2. These stop elements cooperate with counter surfaces that are arranged on a mounting rail and secured on the body of the vehicle. FIGS. 2 and 3, show stop elements 7 which are molded onto a stop disk 6. This disk can be connected to the backside of plastic adapter 2 by a plug connection and has an opening corresponding with the fastening opening of metal body 1. However, as shown in FIGS. 6 to 8, it is possible to also mold stop elements 7 onto plastic adapter 2 so that they form one single piece with this adapter.

Figure 9:
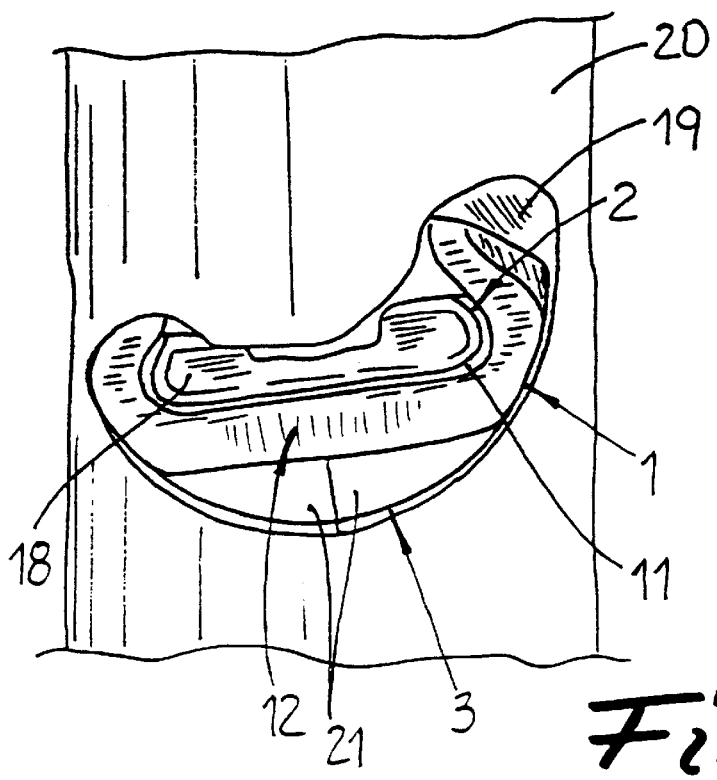
FIG. 9 shows the half-covered installation of the reversing element shown in FIGS. 6 to 8 in the B-post of a motor vehicle.

The set of structural components comprises a set of profiled elements 3 consisting of the differently shaped plastic profiles 4, which can be pushed onto an edge profile 14 of metal body 1 and be coupled in pairs by a plug connection. Plastic profiles 4 have laterally protruding tabs 19 and have a covered or half-covered installation (as shown in FIG. 9) of the reversing element. These profiles engage an opening in covering 20 of the post of the vehicle from behind, wherein these profiles serve as sight shutters. The opening permits pivotal movements of the reversing element within the range of the angle of pivot defined by stop elements 7. These plastic profiles which form covers 19 always cover the remaining part of the opening.

The embodiment shown in FIGS. 6 to 8 is suited for the half-covered installation of the reversing element in the post of a motor vehicle. Metal body 1 has the shape and dimensions described in the previous embodiment. This metal body is a standard component that is used without depending on the given installation situation. Plastic components 2, 4, 6, 7 are adapted to the available installation space. In the embodiment shown in FIGS. 6 to 8, stop elements 7 are molded onto plastic adapter 2, forming one single piece with adapter 2. Furthermore, FIG. 8 also shows that the structural component comprising stop elements 7 forms a spacer piece whose width is adapted to the installation space receiving the reversing element. Plastic profiles 4 have a circular segment-shaped sight area 21 that connects flush with the belt running surface and adapts to the edge of the opening. Lateral tabs 19 adjoin the sight area with a step.

Figure 10:
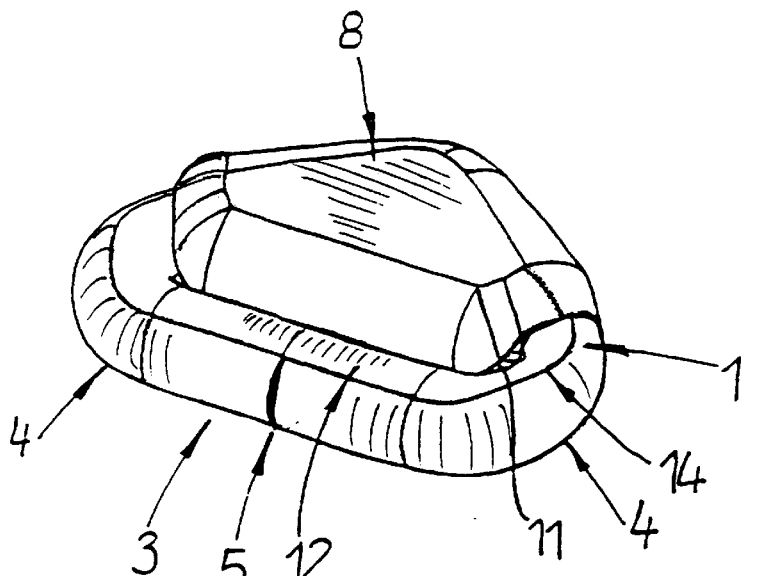
FIG. 10 shows a reversing element assembled from the set of structural components for securing it on the outer side.

Furthermore, it is possible to also readily produce reversing elements from components 1 to 8 of the set of structural components. These reversing elements are visibly arranged on inner surfaces of the interior of the vehicle. This type of an embodiment is shown in FIG. 10. Rounded edge protection profiles are inserted in edge profile 14 of metal body 1 as plastic profiles 4. Moreover, an additional cover cap 8 is secured on the front side of metal body 1. This cap covers the mounting surface and a fastening screw for securing the reversing element on the body of the vehicle.

The application of metal body 1 as a standard component in combination with different plastic components adapted for installation permits a very rational manufacture of reversing elements that can be adapted to the given installation situation. Metal body 1 always provides the reversing element with the properties essentially needed when the seat belt is in use. Metal body 1 is optimally designed for absorbing the forces generated in a crash situation and can be equipped with a sliding coating enhancing the running properties of the belt.

Accordingly, while at least one embodiments of the present invention have been shown and described, it is obvious that many changes and modifications may be made thereunto without departing from the spirit and scope of the invention.

What is claimed is:

1. A set of structural elements for a seat belt guide of a seat belt comprising:
   a) a single piece metal body formed from a steel sheet comprising:
      i) a backside mounting surface having a fastening opening;
      ii) a belt guiding segment having a belt eye, wherein said belt guiding segment forms a running surface with a rounded cross-section;
      iii) a double walled edge profile disposed around said backside mounting surface and said belt guiding segment;
   b) at least one plastic adapter comprising:
      i) a collar insertable into said fastening opening;
      ii) a displaceable body fixable on an upper edge of said belt eye for limiting the gap width of a belt slot;
   c) a plurality of different shaped plastic profiles formed as a cover for said single piece metal body wherein said plastic profiles are laterally pushed over said double walled edge profile, and extend laterally out from said double walled edge profile and are coupled in pairs by a plug connection, wherein said plastic profiles are shaped to adapt to a concrete installation of a motor vehicle, so that said metal body can have a uniformly fixed set of dimensions irrespective of its installation, and wherein said plastic profiles allow said metal body to undergo pivotal movements, and also provide an opening which is located in a covering on a side of the body of the vehicle.

2. The structural components as in claim 1, wherein said metal body has outer dimensions that contain a circle of 43 mm drawn around said metal body, and wherein a spacing between a center point of said fastening opening and said belt running surface is fixed in a range of 19 mm to 24 mm.

3. The structural components as in claim 1 wherein, under test conditions, said belt running surface is subjected to bending centering on the seat belt on said belt running surface.

4. The structural components as in claim 1, wherein said belt running surface has a front side which is bead shaped and is formed with a substantially straight terminal edge.

5. The structural components as in claim 1, wherein said metal body comprises a sliding coating reducing frictional resistance of the belt against said metal body, and wherein said coating consists of a flourine polymer matrix with reinforcing substances embedded therein and having a thickness of less than 100 μm.

6. The set of structural components as in claim 1, further comprising a plurality of stop elements for limiting an angle of pivot, wherein said plurality of stop elements are molded into said plastic adapter.

7. The set of structural components as in claim 1, further comprising at least one stop disk having molded on stop elements for limiting the angle of pivot, wherein said at least one stop disk is connectable to a backside of said plastic adapter by a plug connection, wherein said stop disk contains an opening corresponding with a fastening opening of said metal body.

8. The set of structural components as in claim 1, wherein said plastic profiles are formed as covers that comprise laterally protruding tabs extending laterally out from said metal body.

9. The set of structural components according to claim 1, wherein said plastic profiles comprise a circular segment-shaped guide opening adjoining said belt running surface of said metal body in a flush manner, said guide opening being adapted to an edge of the opening of the body of the vehicle; wherein said lateral tabs adjoin said guide opening with a step.

10. The set of structural components according to claim 1, wherein said profiled elements comprise plastic profiles designed as rounded edge protection profiles.

11. The set of structural components according to claim 1, further comprising: a cover cap securable on a front side of said metal body, wherein said cover cap covers said mounting surface, and a fastening screw for securing the seat belt guide on the body of the vehicle.

12. A set of structural elements for a seat belt guide of a seat belt comprising:
 a) a single piece metal body formed from a steel sheet comprising:
  i) a backside mounting surface having a fastening opening;
  ii) a belt guiding segment having a belt eye, wherein said belt guiding segment forms a running surface with a rounded cross-section;
  iii) a double walled edge profile disposed around said backside mounting surface and said belt guiding segment;
  iv) a sliding coating reducing frictional resistance of the belt against said metal body, and wherein said coating comprises of a fluorine polymer matrix with reinforcing substances embedded therein;
 b) at least one plastic adapter comprising:
  i) a collar insertable into said fastening opening;
  ii) a displaceable body fixable on an upper edge of said belt eye for limiting the gap width of a belt slot;
 c) a plurality of different shaped plastic profiles formed as a cover for said single piece metal body wherein said plastic profiles are laterally pushed over said double walled edge profile, and extend laterally out from said double walled edge profile and are coupled in pairs by a plug connection, wherein said plastic profiles are shaped to adapt to a concrete installation of a motor vehicle, so that said metal body can have a uniformly fixed set of dimensions irrespective of its installation.

* * * * *